Figure 6:
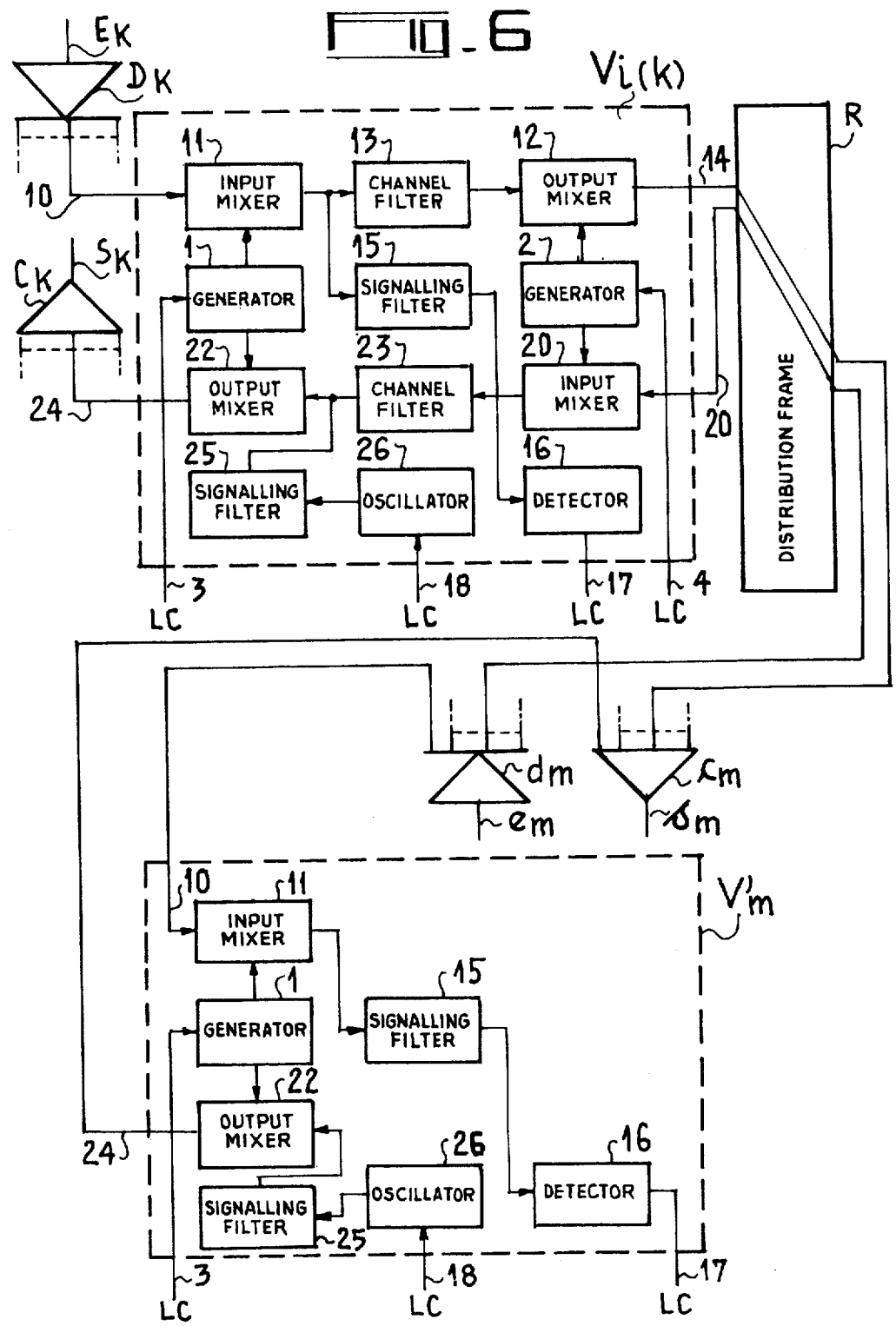

United States Patent [19]

Deman et al.

[11] 4,024,350
[45] May 17, 1977

[54] CHANNEL SWITCHING UNIT FOR A TELEPHONE SWITCHING CENTER AND SWITCHING ARRANGEMENTS UTILIZING SUCH UNITS

[75] Inventors: Pierre Deman; Guy Le Parquier, both of Paris, France

[73] Assignee: Thomson-CSF, Paris, France

[22] Filed: Oct. 30, 1975

[21] Appl. No.: 627,454

[30] Foreign Application Priority Data

Oct. 31, 1974 France .................................. 74.36490

[52] U.S. Cl. ............................................ 179/15 FS
[51] Int. Cl.² ............................................ H04J 1/00
[58] Field of Search ........ 179/15 FS, 15 FD, 2.5 R; 325/49, 50, 137, 184

[56] References Cited

UNITED STATES PATENTS

| 3,364,311 | 1/1968 | Webb | 179/15 FS |
| 3,733,438 | 5/1973 | Haley | 179/15 FD |
| 3,882,279 | 5/1975 | Duval | 179/15 FD |

*Primary Examiner*—William C. Cooper
*Assistant Examiner*—Joseph Popek
*Attorney, Agent, or Firm*—Cushman, Darby & Cushman

[57] ABSTRACT

The switching unit comprises for two-way transmission two branches, each of which includes in series an input mixer, a channel filter and an output mixer, and two variable frequency digitally controlled carrier current generators, the first of which feeds the input mixer of the first branch and the output mixer of the second branch, and the other of which feeds the output mixer of the first branch and the input mixer of the second branch. In a switching arrangement using such units, a telephone channel can be transferred from an incoming multiplexed group to an outgoing multiplexed group by means of two units whose second generators receive a common frequency, while their first generators respectively receive frequencies corresponding to the positions of the considered channel in the incoming and outgoing groups respectively.

16 Claims, 8 Drawing Figures

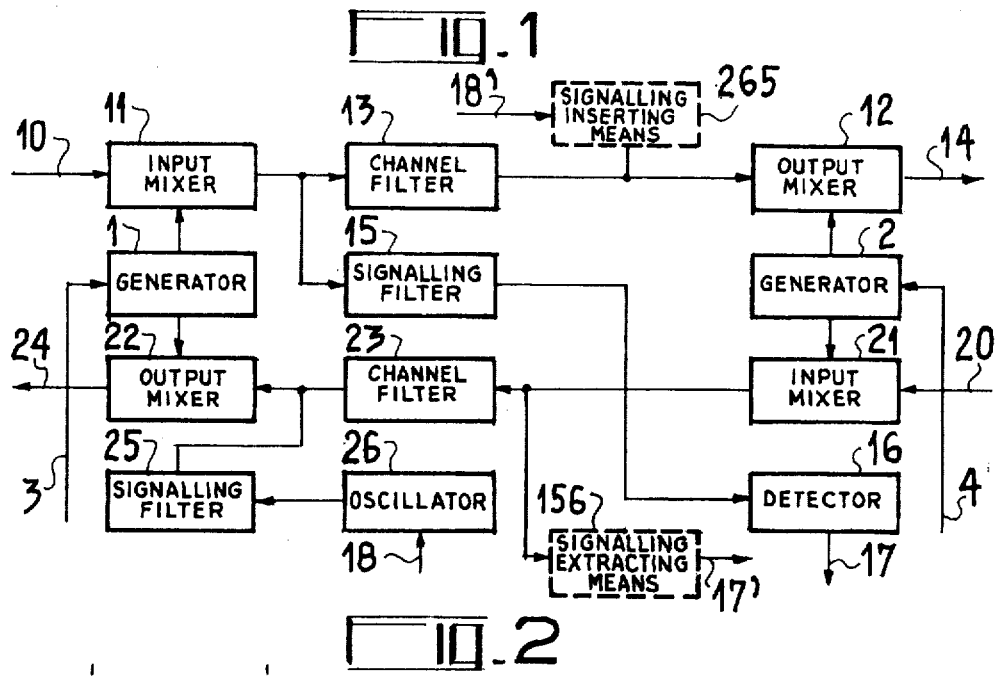
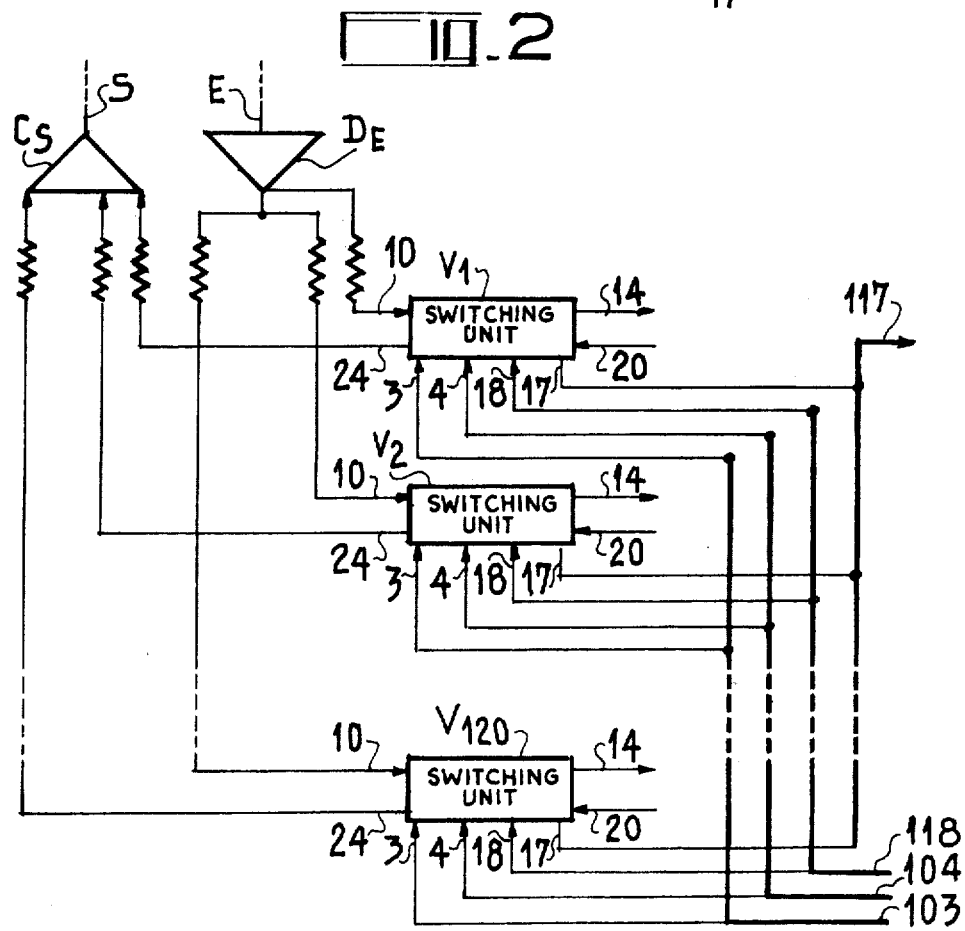

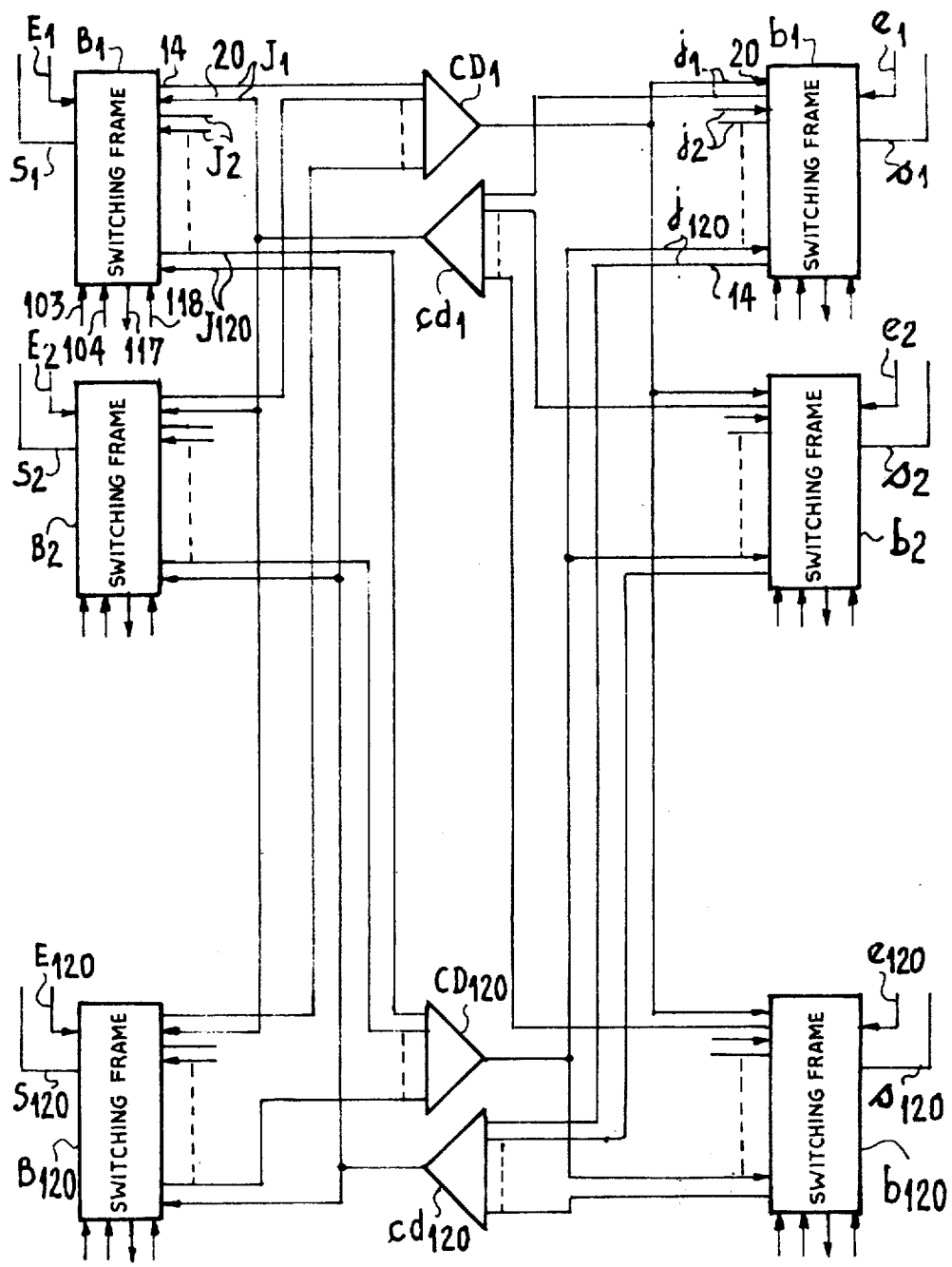

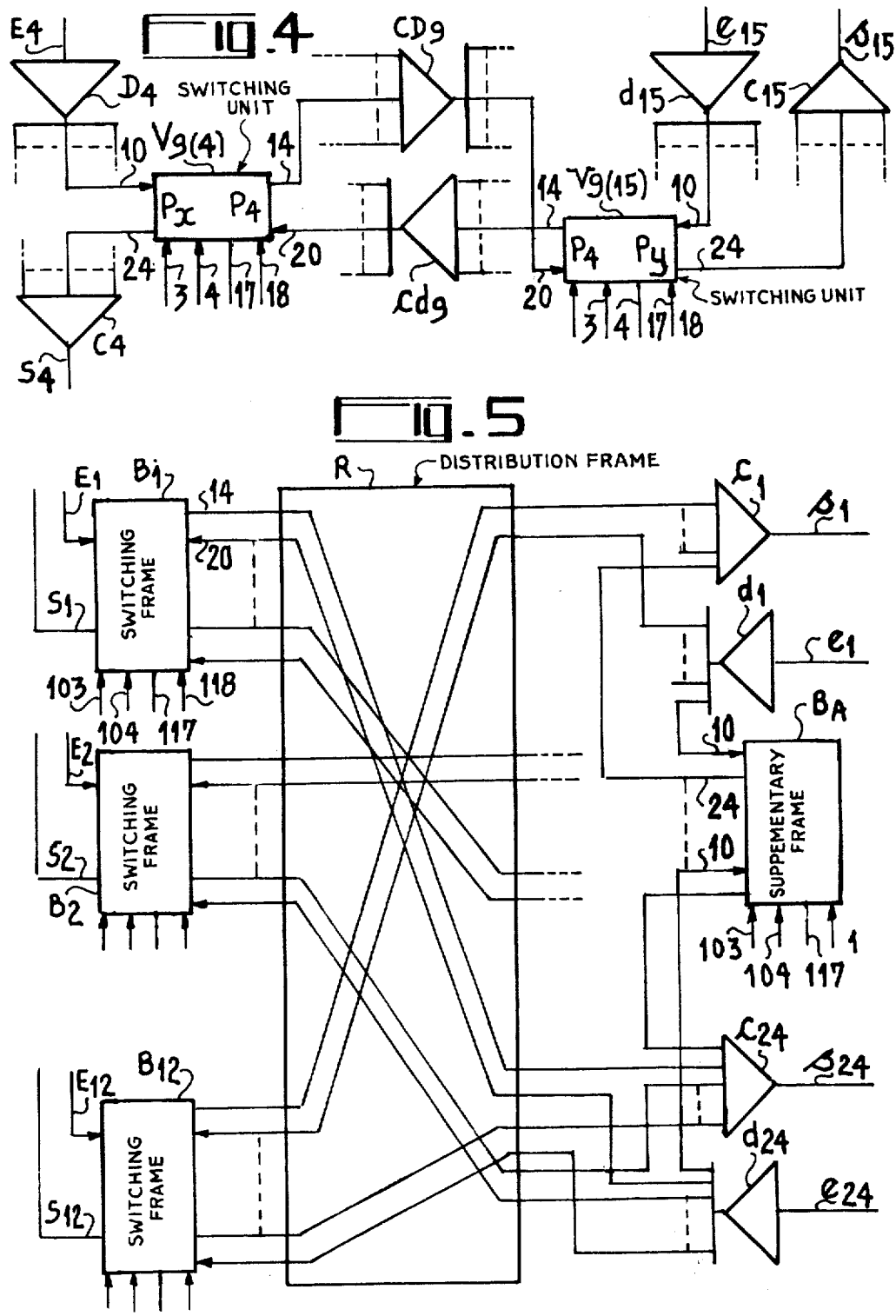

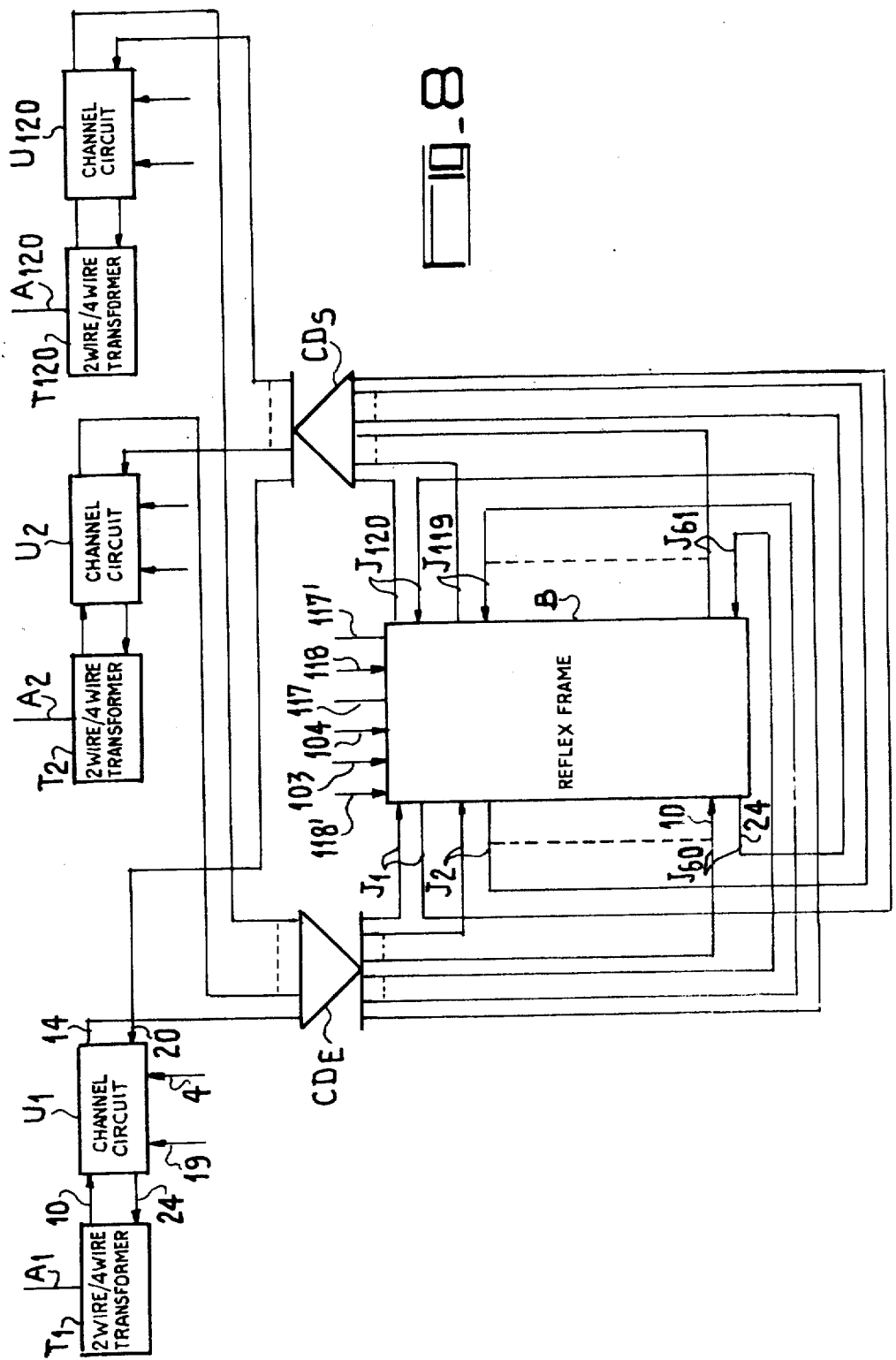

CHANNEL SWITCHING UNIT FOR A TELEPHONE SWITCHING CENTER AND SWITCHING ARRANGEMENTS UTILIZING SUCH UNITS

The present invention relates to a channel switching unit for a telephone switching centre, as well as to switching arrangements utilising this unit.

The telephony under consideration is conventional telephony transmitted by means of analog signals and utilising, for multiplexing, frequency division multiplexing.

It will be recalled that in the present state of this art the functions of transmission (including multiplexing and demultiplexing) and switching are distinctly separate.

The transmission services supply to the switching services low-frequency telephone channels (0.3 to 3.4 kc/s), which are situated in a band from 0 to 4 kc/s when they are multiplexed, the switching service restituting to the transmission services switched low-frequency channels.

Each extraction of a channel rom a group and each introduction of a channel into a group takes place with due regard to the intermediate grades in the hierarchy of the groups, that is to say, in the present French system: primary groups, also called basic groups, of 12 channels occupying the band from 60 to 108 kc/s; secondary groups (312 − 552 kc/s) also called supergroups, of 5 primary groups; tertiary groups, also called mastergroups, of 5 secondary groups (separated by empty bands) (600–1300 kc/s), and so on. In addition many systems utilise the technique of premodulation of the LF (low-frequency) channels by means of a carrier current having a fixed frequency to solve the problem of separating substantially adjacent side bands (when multiplexing), or channels (when demultiplexing) by means of a standard filter.

The channel switching unit according to the invention is designed for switching by the frequency division technique. This technique has been proposed in the Belgium Patent 494,824 to switch $n$ incoming low-frequency channels to $n$ outgoing low-frequency channels, in the following way:

$n$ incoming and $n$ outgoing channel circuits each comprise two branches for two-way transmission. The first branch comprises an input mixer, a double side band channel filter, and an output mixer. The second branch comprises a single mixer, a channel filter identical to that of the first branch, and a detector. The input mixer of the first branch receives a low-frequency input signal and a carrier curent at a fixed frequency $f_o$; the output mixer of the first branch and the mixer of the second branch of an incoming channel circuit receive a carrier current at a frequency $f_i(i = 1, 2 \ldots n)$ which varies according to the considered incoming channel circuit.

The output signals from the output mixers of the first branches of the incoming channel circuits are added together to form a multiplexed group and filtered by a "group filter" which lets through only the lower modulation side bands of the modulation effected by the output mixers.

The output signal from the group filter of the $n$ incoming channel circuits is applied to the mixers of the second branches of the outgoing channel circuits.

In the same way, the low-frequency input signals of the first branches of the outgoing channel circuits are used to form a multiplexed group which is applied to the mixers of the second branches of the incoming channel circuits.

For an incoming channel circuit to be bilaterally coupled to an outgoing channel circuit, it is sufficient that the output mixer of the first branch and the mixer of the second branch of each one of the two circuits all receive the same carrier current, provided the carrier frequencies $f_i$ and the carrier frequency $f_o$ are so chosen that the channel filter of a circuit second branch whose mixer receives a carrier current at the frequency $f_i$ can only let through the channel derived from a circuit first branch whose output mixer received this same current. This implies in this case that the frequency $f_o$ is outside the range of frequencies $f_i$ -$f_o$.

The channel switching unit according to the invention, which is designed for a switching centre operating in a system using single side band multiplexing, comprises a channel circuit differing from the above described channel circuit essentially in that:

- the second branch comprises, like the first one, an input mixer and an output mixer separated by the channel filter;
- the channel filter selects a single side band;
- the two branches form a unit with two identical variable frequency generators, the first of which feeds the carrier current inputs of the input mixer of the first branch and the associated output mixer of the second branch, and the second of which feeds the carrier current inputs of the other two mixers.

The following advantages are thus obtained i. The switching units can be used for forming switching arrangements, the input signals of which, applied to the input mixers of the unit first branches, are formed by one or more standard multiplexed groups of telephone channels and the output signals of which, derived from the output signals from the output mixers of the second branches of other switching units also form, without any further frequency translation, one or more standard multiplexed groups of channels.

ii. Such a switching arrangement does not require any critical filtering between the incoming and outgoing switching units.

iii. Switching arrangements thus obtained may be serially connected without any low-frequency stages, between two consecutive arrangements.

iiii. The fact that each switching unit has its own two controllable variable frequency generators affords, as will be seen, great flexibility for the switching arrangements.

v. A further advantage appears if the switching centre using the switching units operates in a system where multiplexing uses the technique of premodulation for which case there has been proposed in U.S. Patent Application Ser. no. 608,241 for a channel board for telephony transmission equipment using single side band multiplexing, filed Aug. 27, 1975 and assigned to the same assignee as the present application, a transmission channel board comprising, for the purpose of multiplexing, two branches each of which comprises an input mixer and an output mixer separated by a channel filter at the premodulation frequency, the channel board comprising a variable frequency generator for supplying the output mixer of the first branch and the associated mixer (input mixer) of the second branch, for forming primary groups, or higher groups directly from premodulated channels. In that case, if the premodulation frequency and the frequency of the channel filters of the channel switching units are chosen to be equal, the channel switching unit of the present invention may be derived from the transmission channel board through adding thereto a second variable frequency generator, identical to the first one, for feeding the input mixer of the first branch and the output mixer of the second branch and eliminating, if any, the low-frequency filters which may respectively precede the input mixer of the first branch and follow the output mixer of the second branch.

The invention has also for its object switching arrangements using switching units according to the invention.

Figure 7:
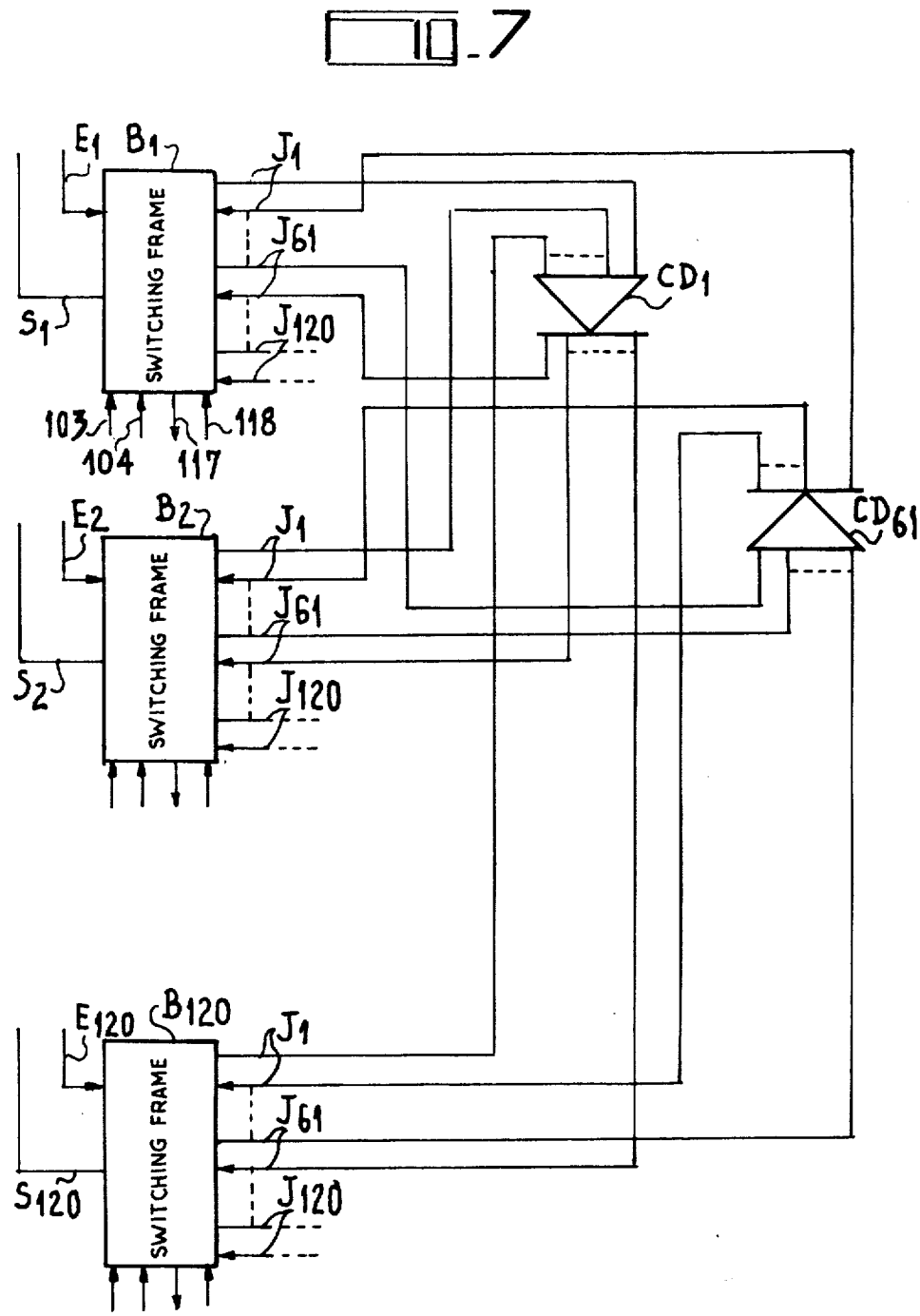

The invention will be more readily understood and further features thereof will become apparent from the following description and the drawings relating thereto, in which:

FIG. 1 illustrates an embodiment of a switching unit according to the invention, FIG. 2 illustrates a switching frame utilising switching units according to FIG. 1, FIG. 3 illustrates a switching matrix utilising two sets of frames such as that of FIG. 2, FIG. 4 illustrates a channel switching performed by the matrix of FIG. 3, FIG. 5 illustrates a switching arrangement utilising a single set of frames, FIG. 6 illustrates a channel switching performed by means of the arrangments of FIG. 5, FIG. 7 illustrates a variant of the matrix of FIG. 3, and FIG. 8 illustrates a variant of a particular case of an arrangement of the type according to FIG. 5.

In the figures, an assembly consisting of a large number of elements is represented by only two or three of them.

FIG. 1 is the diagram of an embodiment of a channel switching unit according to the invention.

The unit comprises an input 10 which supplies a mixer 11, followed by a channel filter 13, at a frequency $F_o$, i.e., whose pass band corresponds to the upper side band of a carrier current at the frequency $F_o$ modulated by a low-frequency telephone channel, which frequency $F_o$ will be specified later for a particular example. The filter 13 supplies a second mixer 12 which feeds an output 14 of the channel circuit.

The circuit comprises a second arrangement which is similar to the first and the elements of which are denoted by numbers increased by 10 in relation to the corresponding elements of the first.

The mixers 11 and 22 are fed by a programmable generator 1 and the mixers 12 and 21 by an identical variable frequency generator 2. The controlled generators are of the feedback control loop type comprising a frequency divider having a variable and controllable divisor N such a generator a fixed reference frequency $F_r$ and produces a frequency $N.F_r$. The generators 1 and 2 are provided with inputs 3 and 4 respectively for the control of the value N of the divisor and therefore of the supplied frequency, each of these inputs 3 and 4 normally comprising two or more wires. The frequency $F_r$ is supplied to the generators by two connections (not shown). The inputs supplying $F_r$ are not shown either in the other figures.

The first branch comprises at the output of the mixer 11 a second filter 15 which extracts the calling frequency $F_s$ (which is, for example, 0 or 3.825 kc/s at low-frequency) translated into frequency $F_o + F_s$, followed by a detector 16.

The second branch comprises, at the input of the mixer 22, a second filter 25 identical to the filter 15, and preceded by an oscillator 26 at said translated calling frequency.

The frequency control inputs 3 and 4 of the generators 1 and 2, the output 17 of the detector 16 and the control input 18 of the oscillator 26 are intended to be connected to the control logic circuit controlling the switching arrangement with which the switching unit is to be associated.

It will be noted that only the signalling filters 15 and 25, the detector 16 and the oscillator 26 identify the two branches of a channel circuit. The latter become interchangeable if as shown in dotted lines in FIG. 1 signalling detecting means 156 —identical to the series circuit 15-10— with an output 17' are connected to the output of mixer 21, and signalling inserting means 265 —identical to the series circuit 26-25— with an input 18' are connected to the input of mixer 12.

They are also interchangeable if the telephone system uses independent channels, called semaphore channels, for the signalling currents, it then being possible for the elements 15, 16, 25 and 26 of the channel circuit of FIG. 1 to be omitted.

As already mentioned, there has been proposed in U.S. Patent Application Ser. no. 608,241 a channel board comprising a programmable generator which performs the same function as the generator 2 of the switching unit described here for the switching, but in which the other generator is replaced by an input or a device supplying a fixed premodulation frequency.

In practice, the switching unit of the present invention may or may not be provided on a channel board.

It is possible to use for the remote control of the frequencies of the genertors 1 and 2 a means proposed for the programmable generator of the transmission channel board, that is to say, to provide in association with each generator a shift register which stores the remote-control bits which determine the value of the divisor N; each input 3 or 4 then comprises two wires, one of which supplies the signals and the other the shifting pulses for the register.

In what follows, the phrases "input cable" and "output cable" will designate two cables which transmit respectively the two directions of transmission of the same telephonic communications, the terms "input" and "output" referring to a switching centre under consideration.

By the terms "incoming" and "outgoing" are meant, respectively, the calling channels arriving at the centre for routing, and the channels routed by the centre in accordance with the call signal.

This being so, the circuit of the channel of FIG. 1 is intended to be used as follows within a switching arrangement.

It receives at its input 10 a group of input channels, for example "incoming" channels, extracts one of them by means of the mixer 11 and the filter 13 and delivers it frequency translated by the mixer 12, at its output 14. Its input 20 receives a group of channels comprising the "return" channel corresponding to the "go" channel supplied by the output 14 and transposed to the same frequency. It extracts it by means of the mixer 21 and the filter 23 and delivers it, re-transposed to the frequency of the incoming channel, at its output 24.

The events are analogous if the input 20 receives a group of "outgoing" input channels, the first branch extracting and transposing one of them and the second branch supplying the corresponding return channel.

The detections and insertions of signalling currents take place by means of the output 17 and the input 18 of the channel circuits.

The switching unit is designed, more precisely, for allowing the switching of a channel from one multiplexed group into another multiplexed group, each of these two groups consisting of all or part of the channels of a group which will be called the "maximum switching group" and in abreviation "MSG". This implies that the frequency $F_o$ of the chanel filter is so chosen relatively to the translation frequencies of the channel of the MSG that there will be a one-to-one correspondence between the carrier current applied to the input mixer of the first branch and the channel selected from an MSG by means of the channel filter following this input mixer; and that the generators can supply all the currents allowing the translation of any desired channel from an MSG into the pass-band of the channel filter. Practically the frequency $F_o$ may be chosen higher than the highest frequency of translation $F_{Max}$ of the channels of the MSG, with a ratio $F_o/F_{Max}$ sufficiently high for the intermodulation products, which might be troublesome, to be of sufficiently high order; a ratio having a good order of magnitude is between 2.5 : 1 and 3 : 1. However a higher ratio may be advantageously used provided particularly if this does not involve considerable difficulty in making the channel filter.

$F_o$ could also be chosen lower than the lowest frequency translation $F_{Min}$ of the channels of the MSG, with a ratio $F_{Min}/F_o$ sufficiently high.

However the first solution is preferred because, taking into account the second modulation performed in the switching units, it makes it possible to use MSG's having a larger number of channels.

The MSG itself will be chosen with due regard to the frequency range which may be covered by the generators which will be used, and whose possibilities vary according to their degree of improvement.

In order to fix ideas, there will be given an example which can be readily materialised with the existing technology. All the frequencies will be indicated in kc/s.

MSG : consisting of the first two secondary groups of 60 channels of the standardised system used in France.

The two secondary groups concerned cover the bands from 60 to 300 kc/s and from 312 to 552 kc/s, the second not being frequency translated and the first being frequency translated with inversion of the spectrum.

Channel filter frequency $F_o$: 2500.

Filters 13 and 23 : quartz filters passing the band 2,500.3 – 2,503.4.

There will be denoted by $P_i$ ($i = 1, 2 \ldots 120$) the frequencies which have to be supplied by a generator in order to translate any channel at the $F_o$ frequency into any position within an MSG or vice versa.

The values of $P_i$ are $(548 - p)4, p = 1, 2 \ldots 60$, i.e., a range of 1952 – 2188 for the 312 to 552 kc/s secondary group and $(701 - p) 4, p = 1, 2 \ldots 60$, i.e., a range of 2564 to 2800 for the first secondary group.

These frequencies make it readily possible to extract without ambiguity any channel from a total or partial MSG by means of the mixer 11 and the quartz filter 13, or the mixer 21 and the filter 23, and to re-transpose it into a total or partial MSG by means of the mixer 12 or the mixer 22.

FIG. 2 illustrates a switching frame utilising 120 switching units $V_1$ to $V_{120}$ according to FIG. 1.

The input 10 and the output 24 of each channel circuit $V_i$ ($i = 1,2 \ldots 120$) are connected respectively to an input cable E and an output cable S by means of, respectively, a distribution coupler $D_E$ consisting of an amplifier which feeds in parallel 120 resistors and of a regrouping coupler $C_S$ consisting of 120 resistors feeding an amplifier.

Couplers $D_E$ and $C_S$, as well as all the other distribution and regrouping couplers used in the switching arrangements which will be described, are couplers with an amplifier, which are aperiodic in the total frequency band of the useful signal which they supply, formed by the whole or part of an MSG, i.e., having a substantially constant gain in this total frequency band; their gain characteristic is on the other hand used for eliminating the undersired modulation products lying outside this useful total frequency band, an elimination which due to the choice of the frequency of the channel filter, does not require and critical filtering.

The signalling output and input 17 and 18 of each switching unit, and the programming inputs 3 and 4 are connected in bundles of lines 117, 118, 103 and 104 extending to the control logic circuit of the switching arrangement.

Finally, the inputs 20 and the outputs 14 of the switching units are free for connections within the switching centre.

Such a frame may receive all or part of an MSG. If other switching operations are to be performed with such frames, for example on a standardised group of 300 channels, the latter may be split up, by using the conventional multiplexing carrier currents, into five secondary groups, four of which will be used to form two MSG's and the fifth a half-MSG.

It is obviously possible to use frames of smaller capacity than the frame of FIG. 2 for operations applied only to smaller groups.

FIG. 3 illustrates an example of electronic switching between two sets of 120 MSG's in each direction.

The matrix of FIG. 3 comprises a first group of 120 frames $B_1$ to $B_{120}$ identical to the frame of FIG. 2, with their input cables $E_i$ ($i = 1, 2 \ldots 120$), their output cables $S_i$ and the inputs 20 and the outputs 14 of the switching units. The matrix comprises a second group of identical frames $b_1$ to $b_{120}$ with their input cables $e_i$ and their output cables $s_i$. In order to simplify the references, the switching units of the frames $b$ will be denoted by $v_i$ (instead of $V_i$ as used in the case of the frames B). The unit $V_i$ of frame $B_j$ and the unit $v_i$ of frame $b_j$ will be denoted by $V_{i(j)}$ and $v_{i(j)}$.

The frames B are incoming frames and the frames $b$ are outgoing frames.

The former frames receive, respectively from their cables E 120 MSG's, the channels of which will be distributed in 120 outgoing MSG' which will be formed on the output cables s of the frames $b$, the return MSG's using the cables $e$ and S.

There will be denoted by $J_k$ the junction of a switching unit $V_k$ of a frame B consisting of its output 14 and its input 20. There will be denoted by $J_{k(m)}$ more precisely the junction $J_k$ of the frame $B_m$. In an analogous manner, the references $j_k$ and $j_{k(m)}$ will be used for the switching units of the frames b.

A junction $J_{k(m)}$ is intended to be coupled to a junction $j_{k(m\ \cdot\ )}$, it being understood that the output 14 of a junction $J_k$ will be coupled to the input 20 of a junction $j_k$ and vice versa.

In this arrangement, each generator always has one of the values $P_1, P_2 \ldots P_{120}$ defined in the foregoing.

In each of the frames B, the frequencies of the generators 1 are variable, but always different for the 120 units V, the 120 different values $P_1, P_2 \ldots P_{120}$ permitting of obtaining the 120 successive channels of the incident MSG, brought to the channel filter frequency, at the outputs of the 120 filters 13 of the frame. For example, in the initial state, the value is $P_i$ for a unit $V_i$.

For each value of $i$ ($i = 1, 2 \ldots 120$), the matrix comprises a regrouping and distribution coupler $CD_i$ consisting of 120 resistors connecting the output 14 of the juctions $J_i$ to the input of an amplifier whose output signal is distributed by means of 120 resistors among the inputs 20 of the junctions $j_i$. For the sake of the clarity of the drawing, each coupler $C_i$ is represented only by its amplifier (the same will henceforth be the case with all the couplers). This makes it possible to constitute for each value of $i$ a transition MSG provided that the generators 2 of the switching units feeding a common coupler have frequencies which are all different (group of frequencies $P_1, P_2 \ldots P_{120}$). The transition MSG is derived from the subtractive frequency conversions effected in the mixers 12, the signal resulting from the additive conversions ($F_o + P_i$) being eliminated in the couplers. For example, the generators 2 of the 120 units of the frame $B_j$ will all have the fixed frequency $P_j$ in a switching operation performed by means of the switching unit of which it forms part. The frequency of the generator 2 of a switching unit v will be determined by that of the switching unit V to which it will be connected. In the absence of such a connection, it will be blocked.

Identical couplers $cd_i$ likewise connect the outputs 14 of the switching $v_i$ of the various frames $b$ to form transition MSG's applied to the inputs 20 of the junctions $J_i$.

The frequency control and signalling circuits being coupled to the monitoring control logic circuit, such a matrix operates as follows:

It will first of all be observed that if the generators 2 of a switching unit $V_{(k)}$ and of a switching unit $v_{(m)}$ have the same frequency, the telephone channel of the MSG which is incident upon the frame $B_k$ and which is carried by $V_i$ will be automatically transferred into the output MSG of the frame $b_m$, and conversely the corresponding return channel contained in the MSG incident upon $b_m$ will be transferred into the output MSG of $B_k$.

If all the switching units are used, there corresponds to each transition MSG formed at a coupler $CD_k$ a transition MSG formed at the coupler $cd_k$.

It will now be assumed that a call arrives at a given instant at the switching unit $V_{8(4)}$ for routing towards the output MSG of the frame $b_{15}$.

The control logic circuit registers this call and determines whether the switching unit $v_8$ of the frame $b_{15}$ is free.

If it is, it assigns to the generators 2 of the units $V_{8(4)}$ and $v_{8(15)}$ the frequency $P_4$, the connection then being made by $CD_8$ for one direction and $cd_8$ for the other.

The central logic circuit determines in the output MSG of the frame $b_{15}$ a free outgoing circuit which corresponds to the required destination and accordingly controls the frequency $P_\nu$ of the generator 1 of the switching unit $v_{8(15)}$. At the same time, it controls by means of the input 18 of the unit $v_{8(15)}$ the dispatch of the corresponding signalling.

If the switching unit $v_8$ of the frame $b_{15}$ is not available, the control logic circuit chooses the first free switching units which are of like position number in the frames $B_4$ and $b_{15}$, for example $V_9$ and $v_9$. It brings about the exchange of the frequencies $P_x$ and $P_{x'}$ of the generators 1 of the switching units $V_8$ and $V_9$ of the frame $B_4$, whereby the unit $V_{9(4)}$ now receives the channel previously received by $V_{8(4)}$. The preceding conditions are thus again established, the connection taking place by means of $CD_9$ and $cd_9$ with the carrier frequency $P_4$.

For the sake of the convenience of the description, it has been assumed that the transition groups are formed by the regrouping at a common coupler of all the channel circuits of like position numbers of the outgoing and incoming frames. The order used merely has the object of facilitating the description and the practical operation of cabling, although it is not essential to the invention. It is sufficient for the transition groups to be formed by the regrouping at a common coupler of channels from units situated on frames which are all different, and for the set of couplers CD, for example, to receive the set of junctions J, for each of them to feed junctions $j$ belonging to different frames, and for the set of junctions $j$ of each frame to be fed by the set of couplers.

The central control logic circuit, which will be carrying out the supervision and the exchange of the signalling as well as the programming of the generators, may be analogous to that of a conventional telephone switching centre. It does not form part of the invention.

FIG. 4 illustrates the two-way transit thus established by means of the switching units $V_{9(4)}$ and $v_{9(15)}$, the state of the latter circuits being symbolically represented by the frequencies of their generators 2 and 1. The input and output couplers of the frame $b_{15}$ are denoted by $d_{15}$ and $c_{15}$ and those of the frame $B_4$ by $D_4$ and $C_4$.

In the example cited, the total matrix has a capacity of $120 \times 120 = 14400$ units.

Of course, it is possible to use rectangular matrices of which the number p of outgoing frames and/or the number p' of incoming frames is different from the number n of channels of the MSG concerned.

The rules to be observed are preferably the following:
- The number of connections of switching unit to switching unit is equal to the product by n of the smaller of the two numbers p and p'.

On the other hand, if a capacity of n channels equal to that of the MSG is used in the transition groups, the number of couplers in each direction will be equal to the larger of the two numbers p and p'. The total number of inputs of the set of couplers CD will be pn and their total number of outputs will be p'n. Consequently, if $p > p'$, each coupler CD will have n inputs and a number of outputs equal to ($p'n/p$) if this quotient is a whole number, or if not, to the whole-numbered part of this quotient, determined by rounding-up or rounding-down, so that the total number of outputs $p'n$ is arrived at. The various couplers cd bring about in the second direction, respectively, the connections made by the couplers CD in the first direction.

- The switching unit regroupings at the couplers must be affected by taking the maximum number of units of different frames.

It is possible also to use matrices whose number of switching units in a set of frames (or in each of the two sets) is greater, in each direction, than the total capacity of the couplers, in order to obtain a better degree of utilisation.

These methods, which are less attractive by reason of the additional complexity of the programming and by reason of the possibility of saturation, may be used in the construction of a centre of very high capacity if the capacity of the MSG is limited for technological reasons. Thus, it is possible with 2 × 300 frames of MSG' of 120 channels to bring the switching capacity to 36000 channels.

The arrangement of FIG. 3 makes it possible to affect absolutely any permutation between 120 × 120 = 14400 incoming channels on the one hand and 14400 outgoing channels on the other hand, without any modification to the material couplings affected by the regrouping and distribution couplers, but it necessitates the formation of transition MSG's (or of secondary transition groups, for example, if the switching takes place between 60 secondary incoming groups and 60 secondary outgoing groups, in which case each set of frames would comprise 60 frames of 60 channel circuits).

The arrangement to be described with reference to FIG. 5, in which the references denote the same elements as in FIG. 3, makes it possible to distribute the channels of incoming channel groups in groups of lower order.

It comprises only one set of frames, which receive the incoming groups and serve directly to form, with the aid of a distribution frame and regrouping couplers, the outgoing groups, and conversely to use the input outgoing groups to form the output incoming group with the aid of distribution couplers and a distribution frame.

It has been assumed in FIG. 5 that the incoming groups consist of 12 MSG's and the outgoing groups of 25 secondary groups $GS_j$ ($j = 1, 2 \ldots 24$).

The set of incoming frames therefore comprises 12 frames $B_1$ to $B_{12}$, with their input and output cables E and S, of 120 switching units $V_1$ to $V_{120}$ each.

On the outgoing side, the secondary groups are formed by means of a set of 24 regrouping couplers $c_j$ ($j = 1, 2 \ldots 24$). Each coupler $c_j$ is fed by the outputs 14 of switching units and feeds the output cable $s_j$. These same secondary outgoing groups are received by a set of 24 distribution couplers $d_j$.

There is inserted between the incoming frames and the outgoing couplers a two-way distribution frame R which couples each junction 14 - 20 of the input frames to an input of regrouping coupler and to an output of the corresponding distribution coupler.

This arrangment presupposes that each incident MSG, $MSG_i$, will have a number of channels to direct to a given outgoing secondary group $GS_j$, at most equal to a fixed number $N_{ij}$, with $\Sigma_i N_{ij} = 60$, $\Sigma_j N_{ij} = 120$.

In other words, the distribution frame R must be wired to take account of the traffic statistics for permanently coupling $N_{ij}$ junctions of each frame $B_j$ to the couplers $c_j$ and $d_j$.

In each frame, the 120 generators 1 have the 120 different frequencies $P_1$ to $P_{120}$.

The generators 2 of the switching units whose junctions are connected to the same couplers $c_j$ and $d_j$ must have different frequencies chosen from the group $P_1$ to $P_{60}$ or $P_{61}$ to $P_{120}$ (making it possible to change from the channel filter frequency to the translation frequencies, in relation to the low frequency, in a secondary group of the lowest frequency band (60 - 300 kc/s) or in an untransposed secondary group (312 - 552 kc/s).

The arrangement operates as follows. A call having been detected at the circuit $V_{i(k)}$ for routing to a direction corresponding to a sub-group of the secondary group $GS_m$, the junction $J_{i(k)}$ may or may not be connected by the distribution frame R to the couplers $c_m$ and $d_m$.

In the second case, the central logic circuit determines the first free junction, e.g. $J_p$, of the frame $B_k$ coupled by the distribution frame to these couplers and brings about the permutation of the frequencies of the generators 1 of the channel circuits $V_{i(k)}$ and $V_{p(k)}$, and the first case is thus established.

The central logic circuit determines on the other hand the first free channel of the sub-group of the secondary group $GS_m$ corresponding to the required destination, and gives the generator 2 of the circuit $V_{i(k)}$ the corresponding frequency $P_y$.

In this embodiment, the detection and insertion of the signalling in regard to the outgoing groups may take place as indicated in the drawing, by way of a supplementary frame $B_A$ whose units V', which will be referred to as "auxiliary", are formed by switching units with incomplete equipment. Each auxiliary unit $V'_i$ comprises only the elements 1, 11, 22, 15, 16, 25 and 26 used for the supervision and exchange of the signals of the outgoing switching units, its inputs 10 being connected respectively to the couplers $d_i$ and its outputs 24 to the couplers $C_i$. The 24 auxiliary units V' are allocated respectively to the 24 outgoing secondary groups and each auxiliary unit V' is used on a time division basis for end-of-call supervisions for which its generator 1 sweeps 60 frequencies P, and for the establishment of a connection which brings into use a switching unit whose generator 2 has a frequency $P_k$, in which case the generator 1, on order from the central logic circuit, them supplies the frequency $P_k$.

For the sake of simplicity of the description, it has been assumed that the mean frequency of the calls is sufficiently low to enable the supervision of a secondary group to be effected by means of a single auxiliary unit.

The signals obtained by detection of the signalling currents of the channels transmitted by a coupler d are supplied at the outputs 17 of the auxiliary units, these outputs being connected to the central logic circuit. The insertion of the signals into the outgoing groups is controlled by the central logic circuit, by means of signals applied to the inputs 18 of the auxiliary units for translation into the appropriate frequency, and supplied by the outputs 24 to the couplers C.

FIG. 6 illustrates a switching operation performed by means of the arrangement of FIG. 5 between an incoming channel using the cables $E_k$ and $S_k$ and the switching unit $V_{ik}$ and an outgoing channel using the cables $s_m$ and $e_m$.

There is denoted by $V'_m$ the auxiliary unit allocated to the secondary group $GS_m$.

There are denoted by "LC" the inputs and outputs connected to the central logic circuit.

It has been assumed in FIGS. 3 and 4 that the frames use switching units according to FIG. 1 (full lines), and it has been shown how an auxiliary frame can be used for this insertion and extraction of the signalling in regard to the outgoing groups.

Another solution consists in using switching units with the elements shown in dotted lines in FIG. 1, in which each branch comprises both means for the insertion and the detection of the signalling. The signalling detecting means of the second branch of a switching unit is then used to detect the signalling on the "input" side of the outgoing channel to which it is coupled, and its signalling insertion arrangement for inserting the signalling of this outgoing channel on the "output" side.

It will noted that the arrangement of FIG. 5 could be adapted to switching between 120 incoming MSG's and 120 outgoing MSG's, a problem which was solved by means of the arrangement of 3. For switching operations of like order, it is more economical in regard to equipment than that of FIG. 3, but it is saturated as soon as the momentary traffic no longer follows the wiring of the distribution frame, which is designed in accordance with the mean statistics.

It is therefore particularly desirable to use jointly arrangements of the two types; for example 60% of the traffic would be dealt with by matrices of the type of FIG. 5 and 40 % by matrices of the type of FIG. 3.

For example, considering the switching of 12 incoming MSG's to 24 secondary outgoing groups, 7 MSG's would be switched by means of a matrix of the first type and 5 by means of a matrix of the second type which, since it cannot be saturated, would perform the routing which the first would no longer be able to perform by reason of the wiring of the distribution frame.

The constructions described in the foregoing are designed for transit centres in which the circuits are specifically incoming and outgoing circuits. The same is not the case at central offices and regional networks for which the circuits may be used for one purpose or the other.

Considering the switching performed by the arrangement of FIG. 4 for the coupling performed by $V_{8(4)}$ and $V_{8(15)}$ between $E_4 - S_4$ connected to a town X and $e_{15} - s_{15}$ connected to a town Y, it will be apparent that it would function in exactly the same way as if $e_5 - s_{15}$ carried on "incoming" group and $E_4 - S_4$ an "outgoing" group. In other words, the connections shown may be used to direct to Y a calling channel emanating from X and to direct to X a calling channel emanating from Y. The arrangement of FIG. 7, which will be referred to as a reflex type matrix, is based upon this principle. It comprises the same set of frames B as that of FIG. 3.

Each pair of cables $E_i - S_i$ carries a mixed MSG containing incoming channels from a given geographical point and outgoing channels going out to this same point.

Finally, transition MSG's will here be formed by regrouping and distribution couplers $CD_k$, the inputs of each coupler $CD_k$ being connected to the output 14 of a switching unit of each frame, for example of the switching units of like position number $k$ (this being assumed only in order to facilitate the explanation, since the switching units of a frame are interchangeable), but the outputs of a coupler $CD_k$ being connected to the inputs 20 of switching units having a position number different from $k$, for example $k + 60$, if $k < 61$ and $k - 60$ if $k > 60$. There will therefore only be a total of 120 couplers of 120 channels (instead of 240 as in FIG. 3) for the two-way connections, but these will be bivalent, that is to say, each of them can perform a routing between an incoming input channel and an outgoing output channel or between an outgoing input channel and an incoming output channel.

As in the previous cases, the generators 1 of the 120 channel circuits of a common frame must have at each instant the 120 different frequencies $P_1$ to $P_{120}$.

The generators 2 of each of the switching units $V_i$ ($i < 61$) of the different frames will always have different frequencies and likewise those of the channel circuits $V_{60+i}$ of the different frames, but these frequencies cannot be chosen a priori.

The arrangement operates as follows.

A call is detected at a unit $V_8$ of the frame $B_4$ intended for a sub-group fed by the frame $B_{15}$. The central control logic circuit determines whether the junction $J_{68}$ of the frame $B_{15}$ is available. If it is, it gives to the generators 2 of units $V_{8(4)}$ and $V_{68(15)}$ a frequency $P_z$ corresponding to a carrier which has not yet been used in the coupler $CD_8$ and consequently has not yet been used in the coupler $CD_{68}$. On the other hand, it determines a free channel of the appropriate sub-group of the outgoing group, relatively to the desired destination, and gives the corresponding frequency to the generator 2 of the unit $V_{68(15)}$, and brings about at its input 18 the insertion of the signalling.

If the junction $J_{68(15)}$ is not free, it determines a pair of junctions $J_k$ and $J_k + 60$ or $J_k - 60$ respectively available at the frames $B_4$ and $B_{15}$; the central control logic circuit changes over the frequencies of the generators 1 of the units $V_{8(4)}$ and $V_{k(4)}$ and gives the generators 2 of the units $V_{k(4)}$ and, assuming k smaller than 61, $V_{(60+k)(15)}$ a frequency corresponding to a carrier which has not yet been used in coupler $CD_k$, the remainder of the operation taking place as before. The couplers used are then $CD_k$ and $CD_{60+k}$.

It is now seen why the coupler $\overline{CD}_k$ fed by the $\overline{120}$ junctions $J_k$ cannot supply the MSG thus formed to the 120 junctions $J_k$, because the two-way connection would then have to take place with the aid of the same coupler $CD_k$, and with the same carrier frequency, since the generators 2 of two switching units coupled together have the same frequency.

An analogous procedure takes place if a call is detected at a switching unit $V_{67(4)}$, for example, which is intended for an outgoing sub-group formed at the cable $S_{15}$ the central logic circuit determines whether the channel circuit $v_{7(15)}$ is free and if this is not so its seeks an available pair of junctions $J_{k(4)}$, $J_{(k+60,15)}$ or $J_{(k-60,15)}$, and gives the generators 2 of the corresponding switching units a frequency corresponding to an available carrier in the couplers concerned.

It may be noted that the arrangement of FIG. 7 is also applicable to the production of complete or incomplete triangular matrices, the rules to be observed then being modified in the sense that the capacity of the couplers is equal to one-half the capacity of the frames.

As before, the given correspondence chosen in the description is not essential to the invention.

FIG. 6 may be adapted in like manner, the frames being used with mixed incoming and outgoing MSG's, but the asymmetry of the exploitation of the signalling may complicate the working in the case of switching units having simple signalling according to FIG. 1 (full lines), FIG. 8 shows a particular case of interest where a single frame B operates on a mixed MSG with 60 switching units.

A distribution coupler has 120 outputs connected to all the inputs 10 and 14 of the 60 switching units. A regrouping coupler having 120 inputs receives the signals from the outputs 20 and 24 of the 60 switching units.

In this example, there are employed switching units whose signalling elements are duplicated in the manner indicated in dotted lines, in FIG. 1, each switching unit having two signalling outputs 17 (branch 10-14) and 17' (branch 20-24) and two signalling inputs 18 (branch 20-24) and 18' (branch 10-14) which are connected to form line bundles 117, 117', 118, 118'.

Owing to this fact and owing to the arrangements of the couplers, the branches 10-14 and 20-24 can be permutated to make a connection and the frame may be regarded as having 120 identical junctions $J_1$ to $J_{60}$ each formed of an input 10 and of an output 24 and $J_{61}$ to $J_{120}$ each formed of an output 14 and of an input 20.

Such a frame, which will be referred to as a reflex frame, makes it possible to effect any desired permutation between carrier frequencies of the various channels of the MSG, for example for effecting a modification of adjacent channel groups or for permitting of interconnecting 120 subscribers of an urban area.

The operation of the frame will be described with reference to this second case.

A two-wire cable $A_i$ coming from the station of each subscriber $Q_i$ is connected to a two-wire/four-wire transformer $T_i$, each transformer $T_i$ being interconnected with a channel circuit $U_i$ which differs from the switching unit of FIG. 1 only by the fact that the programmable generator 1 is replaced by an input 19 supplying the channel filter frequency $F_o$ for the supply of the mixers 11 and 22.

This being so the (bifilar) output of the transformer $T_i$ is connected to the input 10 of the channel circuit $U_i$ and its (bifilar) input to the output 24 of the said channel circuit. The generators 2 of each channel circuit $U_i (i = 1, 2 \ldots 120)$ have the frequency $P_i$, so that, by regrouping of the outputs 14 of the circuits $U_i$ at a regrouping coupler, combined with the distribution coupler of the frame to form a regrouping and distribution coupler $CD_E$, each of the inputs 10 and 20 of the switching units V of the reflex frame receives, with different frequency translations, all the telephone channels of the subscribers Q.

The regrouping coupler of the reflex frame is combined with a distribution coupler to form a coupler $CD_S$.

The inputs of the coupler $CD_S$ are connected to the outputs 14 and 24 of the switching units $V_i$ and its outputs feed respectively the inputs 20 of the channel circuits $U_i$.

At each instant, the 120 generators of the channel circuits $V_i$ have the 120 different frequencies $P_j$.

It will now be assumed that a call coming from the subscriber $Q_1$ is detected at the output 17 of the channel circuit $V_4$ (which means that the generator 1 of this channel circuit had the frequency $P_1$) intended for the subscriber $Q_2$.

The central logic circuit determines (by means of a memory) the switching unit, i.e., $V_x$, of which a generator (1 or 2) has the frequency $P_2$.

A number of cases may arise:

i. The unit $V_x$ is already active, which means that the subscriber $Q_2$ is not free;

ii. The unit $V_x$ is inactive. This case may be subdivided into three.

a. $x = 4$, $V_x$ is identical with $V_4$ and it is then necessarily its generator 2 which has the frequency $P_2$. It is sufficient for the central control logic circuit to bring about the insertion of a signalling current at the input 18 or $V_4$ in order that the communication may be established.

b. $x$ is different from 4, and it is the generator 2 of $V_x$ which has the frequency $P_2$. The central logic element permutates the frequencies of the generators 2 of $V_4$ and of $V_x$, and the case a) is then brought about.

c. $x$ is different from 4, and it is the generator 1 of $V_x$ which has the frequency $P_2$. The central logic element permutates the frequencies of the generators 1 and 2 of $V_x$ and the case b) is brought about. The two combined permutations then give the following: the generator 2 of $V_4$ has taken the frequency $P_2$ of the generator 1 of $V_x$; the generator 2 of $V_x$ has taken the frequency of the generator 1 of $V_4$; the generator 1 of $V_x$ has taken the frequency of the generator 2 of $V_x$.

The events occur symmetrically if a call is detected at an output 17', the path of $Q_1$ calling $Q_2$ this time proceeding through a branch 20-24 (instead of 10-14) and that of $Q_2$ to $Q_1$ by way of a branch 10-14 (instead of 20-24).

In the description of all the frames and switching arrangement, it has been assumed that the switching operations to be performed take place on telephone channels, with each of which there is associated a signalling channel.

These frames may also be used for switching operations on groups of channels each comprising a semaphore channel for the signalling, this semaphore channel carrying a time-division multiplex. In each frame receiving $q$ groups of N channels, with each of which groups there is associated a semaphore channel, there will be inserted $q$ switching units allotted to the semaphore channels and controlled on a time division basis by the central control logic circuit.

In that case, a frame comprises qN channel switching units and $q$ semaphore circuits which may be identical to the channel switching units, provided their generator 2 can supply the frequency $F_o$, a condition which will necessarily be complied with if the low-frequency channel forms part of the MSG. With the numerical example given hereinabove, the generators can easily supply the additional frequency $F_o = 2500$ kc/s which is within their operating range.

Each semaphore channel circuit is then, in the same way as a telephone switching unit, fed at its input 10 by the input coupler of the frame and feeds, though its output 24 the output coupler of this frame. But its output 14 and its (low-frequency) input 20 are connected to the control logic circuit respectively through a demodulator and a modulator, the former including a low-frequency input filter. But simpler channel circuits with a single programmable generator and, for example, receiving the frequency $F_o$ may also be used, for the semaphore channels.

In the claims, the term "telephone channel" is to be understood as a telephone channel in the narrow sense of the word, i.e., used for transmitting speech signals, and by "channel" of a multiplexed group, a channel forming part of the multiplexed group, whether it is a "telephone channel" or not.

It is to be noted, in particular, that the term "switching unit" is not be understood as implying that all the components thereof have a common support. For example, it would be possible to form twelve switching units using twelve channel boards respectively supporting both branches of twelve switching units respectively, and two boards, the first of which would support the twelve generators 1 of the twelve switching units, and the second of which would support the twelve generators 2 thereof, but the term switching unit implies that each switching unit has its own pair of generators, used for feeding the mixers of this sole unit.

Of course, the invention is not limited to the embodiments described and shown which were given solely by way of example.

What is claimed is:

1. A channel switching unit for a telephone switching equipment in a telephony system utilising single side band multiplexing, said switching unit having first and second inputs and first and second outputs and comprising; first and second branches for two-way transmission, each branch comprising in series an input mixer having a first input, a carrier current input and an output, a single side band channel filter having an input connected to said output of said input mixer and an output, and an output mixer having a first input coupled to said output of said channel filter, a carrier current input, and an output, the channel filters of said two branches being identical; and first and second variable frequency generators having respective digital frequency control inputs and respective outputs, the output of said first generator being connected to the carrier current inputs of said input mixer of said first branch and of said output mixer of said second branch, the output of said second generator being connected to the carrier current inputs of said output mixer of said first branch and of said input mixer of said second branch; the first inputs of said input mixers of said first and second branches forming said first and second inputs of said switching unit, the outputs of said output mixers of said first and second branches forming said first and second outputs of said switching unit, each of said generators being able to supply, under the action of control signals applied to its frequency control input, $m$ predetermined carrier currents, respectively associated with the $m$ channels of a predetermined set of multiplexed channels, referred to as the maximum switching group, the pass-band of said channel filters and said m currents being such that said input mixer of said first branch when receiving any one of said $m$ currents at its carrier input, and said maximum switching group at its first input selectively translates into said passband that channel of said maximum switching group which is associated with this carrier current, m being an integer greater than 1.

2. A channel switching unit as claimed in claim 1, wherein said pass-band lies higher than the carrier frequencies of the channels of said maximum switching group.

3. A channel switching unit as claimed in claim 1, wherein in addition to said m predetermined currents, said generators are also able to supply a current allowing the translation of a low-frequency channel into said pass-band.

4. A channel switching unit as claimed in claim 1, further comprising signalling current extracting means connected to said output of said inoput mixer of said first branch and signalling current inserting means connected to said first input of said output mixer of said second branch.

5. A channel switching unit as claimed in claim 4, further comprising further signalling current extracting means connected to said output of said input mixer of said second branch and further signalling current inserting means coupled to said first input of said output mixer of said first branch.

6. A switching circuit referred to as a switching frame, comprising $n_1$ switching units as claimed in claim 1, an input coupler, which is a distribution coupler having at least $n_1$ outputs respectively coupled to the first inputs of said $n_1$ switching units, and an output coupler, which is a regrouping coupler having at least $n_1$ inputs respectively coupled to said second outputs of said $n_1$ switching circuits, $n_1$ being such that $1 \leq n_1 \leq m$.

7. A switching arrangement comprising, for switching telephone channels between $p$ incoming groups of $n_o$ multiplexed channels, $n$ of which are telephone channels and $p'$ outgoing groups of $n_o$ multiplexed channels $n$ of which are telephone channels, $p$ and $p'$ being greater than 1, said arrangement comprising first and second sets E and E' of switching frames as claimed in claim 6, with $m \geq n_o \geq n_1 \geq n$, said set E comprising p switching frames and said set E' comprising $p'$ switching frames, a first set G of couplers having together pn inputs respectively connected to the first outputs of n of the switching units of each one of said frames of said set E, and $p'n$ outputs respectively connected to the second inputs of n of the switching units of each one of said frames of said set E', a second set G' of couplers having respective inputs and outputs, said set G' comprising as many couplers as said set G and each coupler of set G' being associated, according to a one-to-one correspondence, with a coupler of set G, and so connected that each switching unit whose first output is coupled to the second input of another switching unit through a given coupler of set G, has also its second input coupled to the first output of this other switching circuit by means of the coupler of said set G' associated with this given coupler.

8. A switching arrangement as claimed in claim 7, wherein each one of said $n_1$ switching units of each one of said frames of said sets E and E' comprises signalling inserting means and signalling extracting means, and wherein $n = n_1 = n_o$.

9. A switching arrangement comprising, for switching telephone channels between $p$ incoming groups of multiplexed channels, each comprising $n_o$ channels, $n$ of which are telephone channels, $1 < n \leq n_o \leq m$ and $q$ outgoing of $N_o$ mutliplexed channels, N of which are telephone channels, $1 < N \leq N_o$, $p$ and $q > 1$, with $qN 32 pn$, said arrangement comprising a set of $p$ switching frames as claimed in claim 6 with $n_1 \geq n$, q regrouping couplers each having at least $N_o$ inputs and an output, and $q$ distribution couplers each having an input at least and $N_o$ outputs, a two-way distribution frame having inputs respectively connected to the first outputs of $n$ of said $n_1$ switching units of each one of said $p$ switching frames, and to N outputs of each one of said $q$ distribution couplers, and outputs respectively connected to the second inputs of said $n$ switching units of each one of said $p$ switching frames and to N inputs of each one of said q regrouping couplers.

10. A switching arrangement as claimed in claim 9 wherein $n = n_o = n_1$, $N_o = N$ and wherein each one of said switching units of said $p$ switching frames comprises signalling inserting means and signalling extracting means coupled to each one of said two branches thereof.

11. A switching arrangement for switching telephone channels within $p$ mixed groups of multiplexed channels, $p > 1$, each group including $n_o$ channels, $n$ of which are incoming or outgoing telephone channels, said arrangement comprising p switching frames as claimed in claim 6, with $m \geq n_o \geq n_1 \geq n$, and, for interconnecting pn of the $pn_1$ switching units included in said p switching frames, p couplers each of which has n inputs respectively connected to the first outputs of n of said pn switching units, and n outputs respectively coupled to the second inputs of n other ones of said pn switching units.

12. A switching arrangement as claimed in claim 11, wherein $p = n = n_1 = n_o$, wherein each one of said switching units of said switching frames comprises signalling extracting means coupled the first branch thereof, and signalling inserting means coupled to the second branch thereof, and wherein each one of said p couplers has its inputs respectively coupled to the first outputs of p switching units respectively belonging to said p switching frames and its outputs respectively coupled to the second inputs of p switching units respectively belonging to said p switching frames.

13. A switching arrangement for switching telephone channels within a mixed group of incoming and outgoing channels comprising $n_o$ multiplexed channel, n of which are telephone channels, comprising $n_1$ switching units as claimed in claim 1, $m \geq n_o \geq n_1 \geq n$, an input coupler having $2n_o$ outputs, 2n of which are respectively connected to the first and second inputs of n of said $n_1$ switching units, and an output coupler having 2n inputs respectively connected to the first and second outputs of said n switching units 14. A switching arrangement as claimed in claim 13, wherein $n_1 = n = n_o$, and wherein each one of said $n_1$ switching units comprises signalling inserting means and signalling extracting mean coupled to each one of the two branches thereof.

15. A switching arrangement comprising, for switching telephone channels between p incoming groups of $n_o$ multiplexed channels, n of which are telephone channels, and p' outgoing groups of $n_o$ multiplexed channels, n of which are telephone channels, p and p' being greater than 1, said arrangement comprising first and second sets E and E' of switching frames as claimed in claim 6, with $m \geq n_o \geq n1 \geq n$, said set E comprising p switching frames and set E' comprising p' switching frames, a first set G of couplers for coupling the first output of at least one switching unit of each frame of said set E to the second input of at least one switching unit of each frame of said set E' and a second set G' of couplers comprising as many couplers as said set G, each coupler of said set G' being associated, according to a one-to-one correspondence, with a coupler of set G, and so connected that each switching unit whose first output is coupled to the second input of another switching unit through a given coupler of set G, has also its second input coupled to the first output of this other switching circuit by means of the coupler of said set G' associated with this given coupler.

16. A switching arrangement for switching telephone channels within p mixed groups, $p > 1$, of multiplexed channels each group including $n_0$ channels, n of which are incoming or outgoing telephone channels, said arrangement comprising p switching frames as claimed in claim 6, with $m \geq n_o \geq n_1 \geq n$, and a set of couplers for coupling the first output of at least one switching unit of each frame to the second input of at least one switching unit of each frame, each switching unit whose first output is coupled to the second input of another switching unit through a coupler of said set having also its second input coupled to the first output of this other switching unit through another coupler of said set.

* * * * *